US011729883B1

(12) United States Patent
Xiong (10) Patent No.: US 11,729,883 B1
(45) Date of Patent: Aug. 15, 2023

(54) LED DRIVER WITH AUXILIARY OUTPUT AND LOW STANDBY POWER

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 25 days.

(21) Appl. No.: 17/455,850

(22) Filed: Nov. 19, 2021

Related U.S. Application Data (60) Provisional application No. 63/238,404, filed on Aug. 30, 2021.

(51) Int. Cl.
*H05B 45/385* (2020.01)
*H05B 45/14* (2020.01)

(52) U.S. Cl.
CPC ........... *H05B 45/385* (2020.01); *H05B 45/14* (2020.01)

(58) Field of Classification Search
CPC ........ H05B 45/14; H05B 45/10; H05B 45/30; H05B 45/327; H05B 45/385
See application file for complete search history.

(56) References Cited

U.S. PATENT DOCUMENTS

| 2015/0230300 A1* | 8/2015 | Knoedgen | H05B 45/3725 |
| | | | 315/219 |
| 2019/0098713 A1* | 3/2019 | Ye | H05B 45/10 |

FOREIGN PATENT DOCUMENTS

| CN | 104813742 A | * | 7/2015 | ............... H02M 1/08 |
| CN | 106455205 B | * | 4/2018 | ......... H05B 33/0842 |
| CN | 112770452 A | * | 5/2021 | .............. H05B 45/10 |
| CN | 112770455 A | * | 5/2021 | ........... H05B 45/325 |
| EP | 3528378 A1 | * | 8/2019 | ............ H02M 3/335 |
| GB | 2570452 A | * | 7/2019 | .............. H02M 1/15 |

* cited by examiner

*Primary Examiner* — Abdullah A Riyami
*Assistant Examiner* — Syed M Kaiser
(74) *Attorney, Agent, or Firm* — Patterson Intellectual Property Law PC (57) ABSTRACT

A two-stage driver supplies current to a light emitting diode (LED) load. The driver includes a first stage and a second stage. The first stage has a first flyback converter. The first stage is configured to receive a non-regulated voltage input and to generate a substantially constant bulk voltage across a first-stage output filter capacitor. The second stage has a second flyback converter. The second stage is configured to receive the bulk voltage from the first stage. The second stage is further configured to generate a desired current through the LED load. The second stage is electrically isolated from the first stage such that the LED load does not share a common ground reference with the non-regulated voltage input to the first stage. The driver further includes an auxiliary power supply coupled to an auxiliary winding of a transformer of the first flyback converter to generate an auxiliary voltage.

7 Claims, 4 Drawing Sheets

LED DRIVER WITH AUXILIARY OUTPUT AND LOW STANDBY POWER

RELATED APPLICATION

This application claims the benefit under 35 USC. § 119(e) of U.S. Provisional Application No. 63/238,404, filed Aug. 30, 2021, entitled "LED Driver with Auxiliary Output and Low Standby Power," which is hereby incorporated by reference in its entirety.

FIELD OF THE INVENTION

The present disclosure relates generally to lighting systems and, more particularly, to apparatuses to control light emitting diodes (LEDs).

BACKGROUND

A conventional single-stage flyback converter provides a low-cost solution for a class II LED driver. The flyback converter has a low component count, provides a high power factor (PF), has a low third harmonic distortion (THD), and has an isolated output. Control logic within the converter senses the output current through a plurality of LEDs and regulates the output current by controlling a semiconductor switch in a switching circuit. The control logic controls the switching of the semiconductor switch to cause the output current to have a magnitude corresponding to a dimmer control input. Such a conventional single-stage flyback converter has drawbacks. For example, the converter is operable only over a narrow voltage range and a narrow current range. The converter has a high 120 Hz current ripple. The converter may be unstable in a low dimming range, which may cause flickering. The leakage inductance of a flyback transformer in the converter has to be tightly controlled to avoid high voltage overshoot across the switching semiconductor. The control logic has to provide isolation to transfer a feedback control signal from a secondary side to a primary side, which have isolated ground references. These drawbacks limit the application of the single-stage flyback topology in LED driver applications.

SUMMARY

A need exists for a driver for an LED-based lighting system based on flyback topology that eliminates or reduces the drawbacks of a conventional single-stage flyback converter.

One aspect of the embodiments disclosed herein is a driver for light emitting diodes (LEDs). The LED driver includes a first stage voltage generating circuit having a first flyback transformer. The first stage circuit generates a bulk voltage that is loosely controlled to a desired bulk voltage level. A second stage voltage generating circuit has a second flyback transformer. The second stage voltage generating circuit receives the bulk voltage and generates a controlled current to an LED load. The second stage voltage generating circuit tightly controls the current to the LED load. The second stage voltage generating circuit is electrically isolated from the first stage voltage generating circuit. No feedback is provided from the second stage voltage generating circuit to the second stage voltage generating circuit such the first stage voltage generating circuit generates a substantially constant bulk voltage irrespective of the load current.

Another aspect of the embodiments disclosed herein is a two-stage driver that supplies current to a light emitting diode (LED) load. The two-stage driver includes a first stage and an electrically isolated second stage. The first stage has a first flyback converter. The first flyback converter includes a first flyback transformer having a primary winding referenced to a primary ground reference. A secondary winding of the first flyback transformer is referenced to a secondary ground reference. The flyback transformer has at least a first auxiliary winding referenced to an auxiliary ground reference. The first stage is configured to receive a non-regulated voltage input and to generate a substantially constant bulk voltage across a first-stage output filter capacitor. The substantially constant bulk voltage is referenced to the secondary ground reference. The electrically isolated second stage has a second flyback converter. The second stage is configured to receive the bulk voltage from the first stage. The second stage is further configured to generate a desired current through the LED load. An auxiliary power supply is coupled to the first auxiliary winding. The auxiliary power supply generates an auxiliary voltage referenced to the auxiliary ground reference.

In certain embodiments in accordance with this aspect, the first flyback converter includes a first flyback transformer having a primary winding, a secondary winding and an auxiliary winding. A first electronic switch is selectively activated to enable current to flow through the primary winding of the first flyback transformer from the non-regulated voltage input to a primary circuit ground reference. The current flowing through the primary winding of the first flyback transformer induces a voltage on the secondary winding of the first flyback transformer that is applied to the first-stage output filter capacitor to produce the bulk voltage. A first switch controller controls the first electronic switch to selectively activate the first electronic switch. A primary voltage control circuit is coupled to the auxiliary winding of the first flyback transformer. The primary control circuit generates a first sensed voltage responsive to the bulk voltage across the secondary winding of the first flyback transformer. The first sensed voltage is applied to the first switch controller. The first switch controller is responsive to the sensed voltage to control the switching of the electronic switch to maintain the bulk voltage at a substantially constant magnitude.

In certain embodiments, the second flyback converter includes a second flyback transformer having a primary winding and a secondary winding. A second electronic switch is selectively activated to enable current to flow through the primary winding of the second flyback transformer from the first-stage output filter capacitor to a secondary circuit ground reference. The current flowing through the primary winding of the second flyback transformer induces a voltage on the secondary winding of the second flyback transformer that is rectified and applied to the LED load. A current sensor senses a magnitude of a load current flowing through the LED load and generates a sensed feedback signal responsive to the sensed magnitude of the load current. A switch controller applies a switching signal to the second electronic switch to selectively activate the second electronic switch. The switch controller is configured to receive the sensed feedback signal as a first input signal and to receive a dimmer control signal representing a desired magnitude of the load current as a second input signal. The switch controller is configured to compare the sensed feedback signal to the dimmer control signal and to modify the switching signal to maintain the sensed feedback signal at a magnitude determined by the dimmer control signal.

In certain embodiments, the second flyback converter further includes a voltage sensing circuit configured to sense the voltage applied to the LED load and to generate a sensed voltage signal. The sensed voltage signal is applied as a third input signal to the switch controller. The switch controller is further responsive to the sensed voltage signal to further modify the switching signal.

In certain embodiments, the primary voltage control circuit is configured to receive a standby command signal having an active mode and an inactive mode. The primary voltage control circuit is responsive to the standby command signal in the inactive mode to provide the first sensed voltage to the first switch controller at a first sensed voltage level. The first switch controller is responsive to the sensed voltage at the first sensed voltage level to control the switching of the electronic switch to maintain the bulk voltage at a first substantially constant magnitude. The primary voltage control circuit is responsive to the standby command signal in the active mode to provide the first sensed voltage to the first switch controller at a second sensed voltage level. The first switch controller is responsive to the sensed voltage at the second sensed voltage level to control the switching of the electronic switch to maintain the bulk voltage at a second substantially constant magnitude.

In certain embodiments in accordance with this aspect, the second flyback converter includes a flyback transformer having a primary winding and a secondary winding. An electronic switch is selectively activated to enable current to flow through the primary winding of the flyback transformer from the first-stage output filter capacitor to a secondary circuit ground reference. The current flowing through the primary winding of the flyback transformer induces a voltage on the secondary winding of the flyback transformer that is rectified and applied to the LED load. A current sensor senses a magnitude of a load current flowing through the LED load and generates a sensed feedback signal responsive to the sensed magnitude of the load current. A switch controller applies a switching signal to the electronic switch to selectively activate the electronic switch. The switch controller is configured to receive the sensed feedback signal as a first input signal and to receive a dimmer control signal representing a desired magnitude of the load current as a second input signal. The switch controller is configured to compare the sensed feedback signal to the dimmer control signal and to modify the switching signal to maintain the sensed feedback signal at a magnitude determined by the dimmer control signal.

In certain embodiments, the second flyback converter further includes a voltage sensing circuit configured to sense the voltage applied to the LED load and to generate a sensed voltage signal. The sensed voltage signal is applied as a third input signal to the switch controller. The switch controller is further responsive to the sensed voltage signal to further modify the switching signal.

Another aspect of the embodiments disclosed herein is a method of controlling the current through light emitting diodes (LEDs) comprising generating a bulk DC voltage from an input source using a first flyback converter stage having a first flyback transformer. The first flyback transformer has a first primary winding referenced to a primary ground reference. The first flyback transformer has a secondary winding referenced to a secondary ground reference. The secondary ground reference is isolated from the primary ground reference. The first flyback transformer has an auxiliary winding referenced to an auxiliary ground reference. The auxiliary ground reference is isolated from the primary ground reference and isolated from the secondary ground reference. The method further comprises converting the bulk DC voltage to a controlled current through the LEDs using a second flyback converter having a second flyback transformer. The second flyback transformer has a second primary winding referenced to the secondary ground reference. The method further comprises rectifying a voltage across the auxiliary winding of the first flyback transformer to produce a rectified voltage and regulating the rectified voltage to generate an auxiliary voltage. The auxiliary voltage is referenced to the auxiliary ground reference.

In certain embodiments in accordance with this aspect, the method further includes receiving a standby control signal in an inactive mode and generating the bulk DC voltage at a first magnitude; and receiving the standby control signal in an active mode and generating the DC voltage at a second magnitude, the second magnitude lower than the first magnitude.

DETAILED DESCRIPTION

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
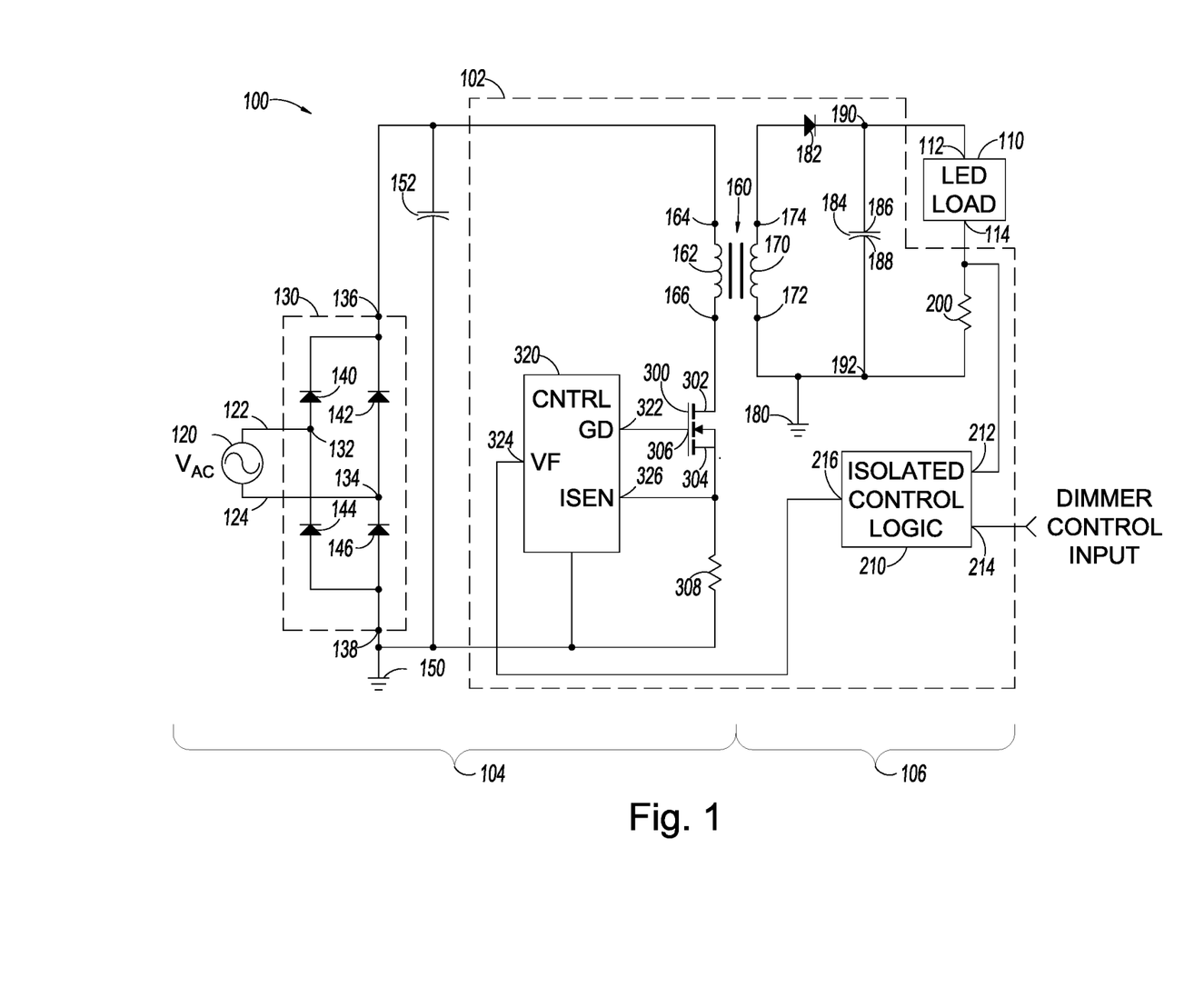
FIG. 1 illustrates a circuit diagram of an exemplary single-stage flyback converter configured as an LED driver to drive an LED load.

FIG. 1 illustrates a conventional LED driver circuit 100 based on a flyback converter 102. The LED driver circuit includes a primary section 104 and a secondary section 106. The LED driver circuit provides current to an LED load 110. In the illustrated embodiment, the LED load comprises a plurality of LEDs (not shown) connected between a first LED load terminal 114 and a second LED load terminal 114. The load current flowing through the LEDs causes the LEDs to illuminate. In order to provide consistent illumination, the load current through the LEDs is maintained at a substantially constant magnitude. The illustrated driver circuit utilizes a secondary current sensing technique (described below) to control the secondary current.

An AC source 120 provides an AC input voltage to the LED driver circuit 100 via a first AC input line 122 and a second AC input line 124. In the illustrated embodiment, the AC input voltage may vary from 86 volts RMS to 265 volts RMS. The AC input voltage between the first AC input line and the second AC input line is applied between a first input terminal 132 and a second input terminal 134 of a full-wave bridge rectifier 130. The bridge rectifier has a first output terminal 136 and a second output terminal 138. A first rectifier diode 140 has an anode connected to the first input terminal and a cathode connected to the first output terminal. A second rectifier diode 142 has an anode connected to the second input terminal and a cathode connected to the first output terminal. A third rectifier diode 144 has an anode connected to the second output terminal and has a cathode connected to the first input terminal. A fourth rectifier diode 146 has an anode connected to the second output terminal and has a cathode connected to the second input terminal. The bridge rectifier operates in a conventional manner to produce a pulsating DC voltage on the first output terminal which is referenced to the second output terminal. The second output terminal is connected to a primary ground reference 150. An input filter capacitor 152 is connected between the first output terminal and the primary ground reference. The input filter capacitor smooths the pulsating DC voltage.

The first output terminal 136 of the bridge rectifier 130 is connected to a first terminal 164 of the primary winding 162 of a flyback transformer 160 in the flyback converter 102. The flyback transformer galvanically isolates the primary section 104 of the LED driver circuit 100 from the secondary section 106. The primary winding of the flyback transformer has a second terminal 166. The flyback transformer has a secondary winding 170, which has a first terminal 172 and a second terminal 174. The flyback transformer has an N:1 turns ratio between the primary winding and the secondary winding such that the voltage across the primary winding is N times the voltage across the secondary winding and such that the current through the secondary winding is N times the current through the primary winding. The flyback transformer may also have at least one auxiliary winding (not shown in FIG. 1).

The first terminal 172 of the secondary winding 170 of the flyback transformer 160 is connected to secondary ground reference 180. The secondary ground reference is electrically isolated from the primary ground reference 150 by the flyback transformer. The second terminal 174 of the secondary winding is connected to the anode of a secondary diode 182. The cathode of the secondary diode is connected to the first terminal 186 of a secondary filter capacitor 184. The secondary filter capacitor may also be referred to as an output filter capacitor. A second terminal 188 of the secondary filter capacitor is connected to the secondary ground reference and thus to the first terminal of the secondary winding of the flyback transformer. In one embodiment, the secondary filter capacitor has a capacitance of approximately 2,000 microfarads. The cathode of the secondary diode and the first terminal of the secondary filter capacitor are connected to a first output terminal 190 of the LED driver circuit 100, which is connected to the first terminal 114 of the LED load 110. The secondary ground reference is connected to a second output terminal 192 of the LED driver circuit via a secondary current sensing resistor 200. The second output terminal of the LED driver circuit is connected to the second terminal 114 of the LED load.

The second terminal 114 of the LED load 110 is connected to a first input 212 of an isolated control logic circuit 210. A second input 214 of the isolated control logic circuit receives a dimmer control input from a dimmer control source (not shown). The dimmer control input has a voltage corresponding to a desired current flow through the LED load. The current lowing through the current sensing resistor 200 generates a voltage across the current sensing resistor proportional to the magnitude of the current flowing through the LED load. The isolated control logic circuit compares the voltage across the current sensing resistor with the voltage of the dimmer control input and generates a feedback signal on an output terminal 216 responsive to the difference in the two voltages. The feedback signal on the output terminal of the isolated control logic circuit is isolated from the secondary ground reference 180 and is referenced to the primary ground reference 150. For example, the isolated control logic circuit may include an optical isolator in an output circuit.

As further shown in FIG. 1, the second terminal 166 of the primary winding 162 of the flyback transformer 160 is connected to a first terminal 302 of a semiconductor switch 300. The switch further includes a second terminal 304 and a control (gate) terminal 306. For example, the semiconductor switch may comprise a metal oxide semiconductor field effect transistor (MOSFET) wherein the first terminal is the drain of the MOSFET, the second terminal is the source of the MOSFET, and the control terminal is the gate of the MOSFET. In the illustrated embodiment, the MOSFET is an N channel enhancement mode transistor, which is normally off (e.g., has a high impedance between the drain and the source). The MOSFET turns on to provide a low-impedance path (e.g., a few tens of milliohms) between the drain and the source when a sufficiently large voltage differential is applied between the gate and the source of the MOSFET. The second terminal (source) of the MOSFET is connected to the primary ground reference 150 via a primary current sensing resistor 308. When the MOSFET is turned on, a current flows from the first output terminal 136 of the bridge rectifier 130, through the primary winding 162 of the flyback transformer 160, through the MOSFET from the first terminal (drain) to the second terminal (source), and to the primary ground reference via the primary current sensing resistor. A voltage is developed across the primary current sensing resistor. The voltage is proportional to the current through the current flowing through the primary winding.

The control terminal (gate) 306 of the MOSFET 300 is controlled by a gate drive (GD) output terminal 322 of a switch controller integrated circuit (CNTRL IC) 320. In the illustrated embodiment, the switch controller IC comprises an L6562 transition-mode power factor correction (PFC) controller, which is commercially available from STMicroelectronics of Geneva, Switzerland. The switch controller IC receives a feedback voltage via a voltage feedback (VF) input terminal 324, which is connected to receive the feedback voltage from the output terminal of the isolated control logic circuit 210 in the secondary section 104. Thus, the switch controller IC receives a voltage responsive to the difference between the instantaneous LED load current flowing through the current sensing resistor 200 and the desired LED load current. The switch controller IC further includes a current sense (ISEN) input terminal 326, which receives the voltage generated across the primary current sensing resistor 308. The voltage is proportional to the current through the primary winding 162 of the flyback transformer 160. The switch controller IC monitors this current sensing voltage internally to determine when to switch off the gate drive signal on the gate drive (GD) output terminal 322. The illustrated switch controller IC includes additional inputs (e.g., power input and compensation inputs), which are not shown in FIG. 1.

The switch controller IC 320 operates in a conventional manner to output a high output signal on the gate drive (GD) output terminal 322 to turn on the MOSFET 300 to cause current to flow through the primary winding 162 of the flyback transformer 160 from the first terminal 164 to the second terminal 166 of the primary winding. The switch controller IC outputs a low output signal on the gate control output terminal to turn off the MOSFET to stop current flow through the primary winding of the transformer. The time varying current flowing through the primary winding generates current flow in the secondary winding 170, which is rectified by the secondary diode 182 and which is applied to the secondary filter capacitor 184 to thereby charge the secondary filter capacitor. The voltage across the secondary filter capacitor is applied to the LED load 110 to cause an output current to flow through the load.

The output current flowing through the LED load 110 is sensed by the secondary current sensing resistor 200. The voltage representing the sensed current is compared to the voltage of the dimmer control input signal to produce the feedback signal, which is applied to the voltage feedback input (VF) of the switch controller IC 320, as described above. The switch controller IC is responsive to the feedback signal to switch the MOSFET 300 on and off with varying durations to adjust the voltage across the secondary filter capacitor to a magnitude sufficient to cause the current flowing through the LED load to have a desired magnitude (e.g., 180 milliamps in one example). Note that although the operation of the switch controller IC determines the voltage across the secondary filter capacitor, the actual voltage across the LED load required to maintain the desired current through the LED load varies with the characteristics of the LEDs within the LED load and also varies with other factors such as, for example, temperature. Thus, it should be understood that the sensed output current through the LED load is the controlled parameter. The secondary voltage across the LED load may vary to maintain the sensed current magnitude at or near the desired output current magnitude (e.g., at approximately 180 milliamperes in certain embodiments).

As discussed above, the conventional LED driver circuit 100 illustrated in FIG. 1 has a number of drawbacks. For example, the converter is operable only over a narrow voltage range and a narrow current range. The converter has a high 120 Hz current ripple. The converter may be unstable in a low dimming range which may cause flickering. The leakage inductance of a flyback transformer in the converter has to be tightly controlled to avoid high voltage overshoot across the switching semiconductor. The control logic has to provide isolation to transfer a feedback control signal from a secondary side to a primary side which have isolated ground references. These drawbacks limit the application of the single-stage flyback topology in LED driver applications.

Figure 2:
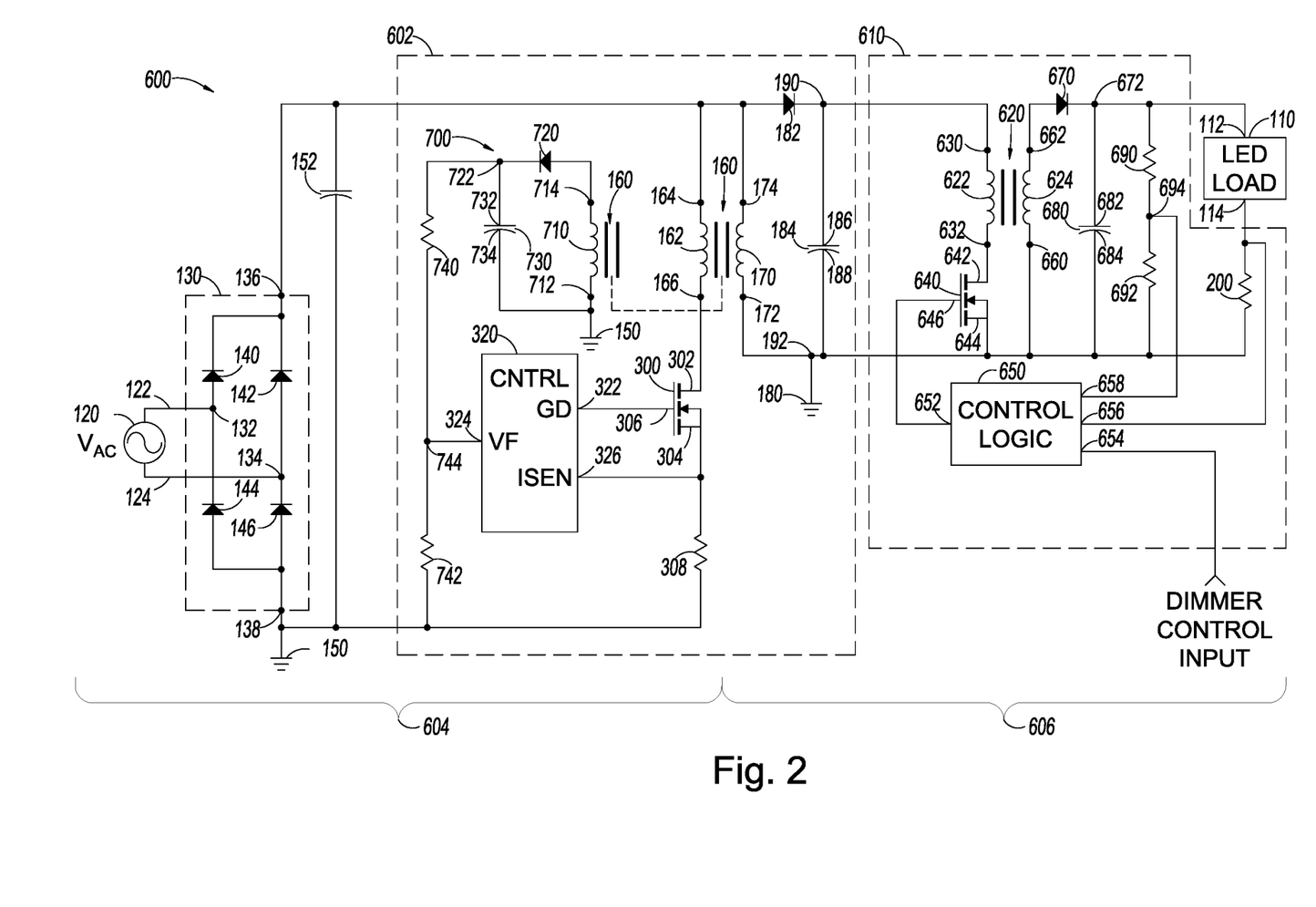
FIG. 2 illustrates a circuit diagram of an improved LED driver having a non-isolated flyback converter interposed between the single-stage flyback converter and the LED load.

FIG. 2 illustrates an LED driver 600 that avoids the drawbacks of the LED driver 100 of FIG. 1. The LED driver of FIG. 2 includes a modified flyback converter 602 in a modified primary section 604. The LED driver of FIG. 2 further includes a modified secondary section 606. The LED driver circuit of FIG. 2 includes elements corresponding to the elements of the LED driver circuit 100, and like elements are identified with the corresponding reference numbers.

In the LED driver 600 of FIG. 2, the modified secondary section 606 includes a non-isolated secondary stage flyback converter 610 connected between the first output terminal 190 of the modified flyback converter 602 and the LED load 110. The secondary stage flyback converter includes a second flyback transformer 620 having a primary winding 622 and a secondary winding 624. A first terminal 630 of the primary winding of the second flyback transformer is connected to the first output terminal 190 of the modified flyback converter 602 to receive a bulk voltage generated across the secondary filter capacitor 184. A second terminal of the primary winding of the second flyback transformer is connected to a first (drain) terminal 642 of a second MOSFET 640. A second (source) terminal 644 of the second MOSFET is connected to the second output terminal 192 of the further modified flyback converter and is thus connected to the secondary ground reference 180. A gate terminal 646 of the second MOSFET is connected to an output terminal 652 of a control logic circuit 650. The control logic circuit has a first input terminal 654, which is connected to receive the dimmer control input signal. The control logic circuit has a second input terminal 656 connected to the second terminal 114 of the LED load 110 and thus connected to receive the voltage developed across the current sensing resistor 200, which is proportional to the current through the LED load. The control logic circuit has a third input terminal 658. The connection to the third input terminal of the control logic circuit is described below.

The secondary winding 624 of the second flyback transformer 620 has a first terminal 660 and a second terminal 662. The first terminal is connected to the secondary ground reference 180. The second terminal is connected to an anode of a secondary flyback converter diode 670. A cathode of the secondary flyback converter diode is connected to an output terminal 672 of the secondary stage flyback converter 610. A secondary flyback converter filter capacitor 680 has a first terminal 682 connected to the output terminal of the secondary stage flyback converter and has a second terminal 684 connected to the secondary ground reference.

A first secondary voltage sensing resistor 690 and a second secondary voltage sensing resistor 692 are connected in series between the output terminal 672 of the secondary stage flyback converter 610 and the secondary ground reference 180. The two voltage sensing resistors are connected at a secondary voltage sensing node 694. The two voltage sensing resistors are connected as a voltage divider circuit such that the voltage on the secondary voltage sensing node is proportional to the voltage between the output terminal of the secondary stage flyback converter and the secondary ground reference. The secondary voltage sensing node is connected to the third terminal 658 of the control logic circuit 650.

The control logic circuit 650 receives the voltage across the output current sensing resistor 200 on the second input terminal 656 and receives the voltage representing the desired current on the first input terminal 654. The control logic circuit compares the two voltages and regulates the switching of the second MOSFET 640 to adjust the output current to correspond to the desired current. The control logic circuit also receives the voltage proportional to the output voltage on the third input terminal 658 and adjusts the switching of the second MOSFET to maintain the output voltage within a desired voltage range.

The LED driver 600 of FIG. 2 has a number of advantages. The primary winding 622 and the secondary winding 624 of the second flyback transformer 620 have respective terminals connected to the secondary ground reference 180.

The source terminal 646 of the second MOSFET 640 is connected to the secondary ground reference, and the control logic circuit 650 is also connected to the secondary ground reference. Thus, the secondary flyback transformer is not electrically isolated, which allows the gate drive circuitry to be a simple logic signal referenced to the secondary ground reference.

The LED load 100 is not electrically isolated from the primary winding 622 of the second flyback transformer 620 because the secondary winding 624 and the primary winding are connected to the common secondary ground reference 180. However, electrical isolation of the LED load from the primary winding of the secondary flyback transformer is not necessary because the flyback transformer 160 in the modified flyback converter 602 provides electrical isolation between the modified primary section 604 and the modified secondary section 606 and thus isolates the LED load from the modified primary section. The LED load in FIG. 2 is not in the main power path from the secondary filter capacitor 184. Thus, even if the second MOSFET 640 is shorted, no large currents will flow through the LED load and no large voltage will appear across the LED load because the secondary flyback transformer provides power isolation between the secondary filter capacitor and the LED load. Accordingly, no additional control circuitry is needed to handle a short across the second MOSFET. This simplifies the design of the LED driver and reduces the cost.

The current through the LED load 110 is tightly controlled by the secondary stage flyback converter 610. Thus, the bulk voltage output of the modified first stage flyback converter 602 on the first output terminal 190 applied across the secondary filter capacitor 184 does not have to be tightly controlled. Accordingly, the LED driver 600 of FIG. 2 does not have any feedback from the modified secondary section 606 to the modified primary section 604. Instead, the modified primary section includes a simple primary voltage control circuit 700 comprising a first auxiliary winding 710 forming part of the isolated flyback transformer 160. A first terminal 712 of the first auxiliary winding is connected to the primary ground reference 150. A second terminal 714 of the first auxiliary winding is connected to an anode of a power supply diode 720. A cathode of the power supply diode is connected to a voltage output node 722. A first terminal 732 of a power supply filter capacitor 730 to the voltage output node. A second terminal 734 of the power supply filter capacitor is connected to the primary ground reference 150. A first power supply voltage sensing resistor 740 and a second power supply voltage sensing resistor 742 are connected in series between the voltage output node and the primary ground reference. The two power supply voltage sensing resistors are connected at a power supply voltage sensing node 744. The power supply voltage sensing node is connected to the voltage feedback (VF) input terminal 324 of the switch controller IC 320.

The voltage control circuit 700 operates as a simple power supply that rectifies a voltage developed across the first auxiliary winding 710 and produces a rectified voltage across the power supply filter capacitor 730. A voltage proportional to the rectified voltage is produced on the power supply sensing node 744 and is thus applied to the voltage feedback (VF) input terminal 324 of the switch controller IC 320. The switch controller IC is responsive to the sensed voltage to vary the drive signals applied to the MOSFET 300 to maintain the sensed voltage at a substantially constant voltage determined by an internal reference voltage $V_{REF}$ within the switch controller IC. The voltage developed across the first auxiliary winding is proportional to the voltage across the secondary winding. Accordingly, a voltage $V_{CSEC}$ developed across the secondary filter capacitor 184 has the following relationship to the reference voltage within the switch controller IC:

$$V_{CSEC} = N_{SA} \times V_{REF} \left( \frac{R_{740} + R_{742}}{R_{742}} \right) \quad (1)$$

In Equation (1), $R_{740}$ is the resistance of the first power supply voltage sensing resistor 740 and $R_{742}$ is the resistance of the second power supply voltage sensing resistor 742. In Equation (2), $N_{SA}$ is the turns ratio of the number $N_S$ of secondary turns to the number $N_A$ of auxiliary turns of the isolated flyback transformer 160 of FIG. 2.

As illustrated in FIG. 2, no feedback is required from the secondary section 604 to the primary section 606 to control the magnitude of the bulk voltage generated by the modified flyback converter 602 in the primary section. Accordingly, no isolated feedback circuitry is required, which reduces the complexity and cost of the LED driver 600.

Since the further modified secondary section 606 uses the flyback converter 610 with the non-isolated second flyback transformer 620, the turns ratio between the primary winding 622 and the secondary winding 624 of the second flyback transformer is selected to minimize the current through the second MOSFET 640 and the primary winding. The lower current allows the second MOSFET to operate with a moderate drain-to-source on-resistance and also allows the use of smaller wire in the second flyback transformer. Both advantages reduce the cost of the LED driver 600.

The ability to select the turns ratio for the non-isolated second flyback transformer 620 allows the bulk voltage generated by the first flyback transformer 160 and applied across the secondary filter capacitor 184 to be increased. For example, for a 55-watt LED driver 600 having a bulk voltage across the secondary filter capacitor of approximately 60 volts, the secondary filter capacitor should have a capacitance of at least 470 microfarads to control the 120 Hz voltage ripple within a certain range (e.g., +/−10%). Increasing the turns ratio of the second flyback transformer allows the bulk voltage across the secondary filter capacitor to be increased to 200 volts. The energy E stored in the secondary filter capacitor is determined as $E = \frac{1}{2}CV^2$, wherein C is the capacitance of the secondary filter capacitor and V is the bulk voltage across the secondary filter capacitor. By increasing the bulk voltage to 200 volts, the capacitance of the secondary filter capacitor can be decreased to 47 microfarads. A 47-microfarad electrolytic capacitor at 200 volts has a much small cost and size than a 470-microfarad capacitor at a lower voltage.

Increasing the bulk voltage on the secondary filter capacitor 184 has a further benefit of allowing the turns ratio between the primary winding 162 and the secondary winding 170 of the first flyback transformer 160 to be 1:1. The 1:1 turns ratio permits the use of bifilar wire to wind the primary winding and the secondary winding together in a single operation. The bifilar winding simplifies the manufacturing process and substantially reduces the leakage inductance of the primary winding. The reduced leakage inductance improves the efficiency of the primary section 604 and substantially reduces voltage ringing on the first MOSFET 300 when the first MOSFET is turned off. The reduced voltage ringing improves the electromagnetic interference (EMI) of the LED driver 600.

Figure 3:
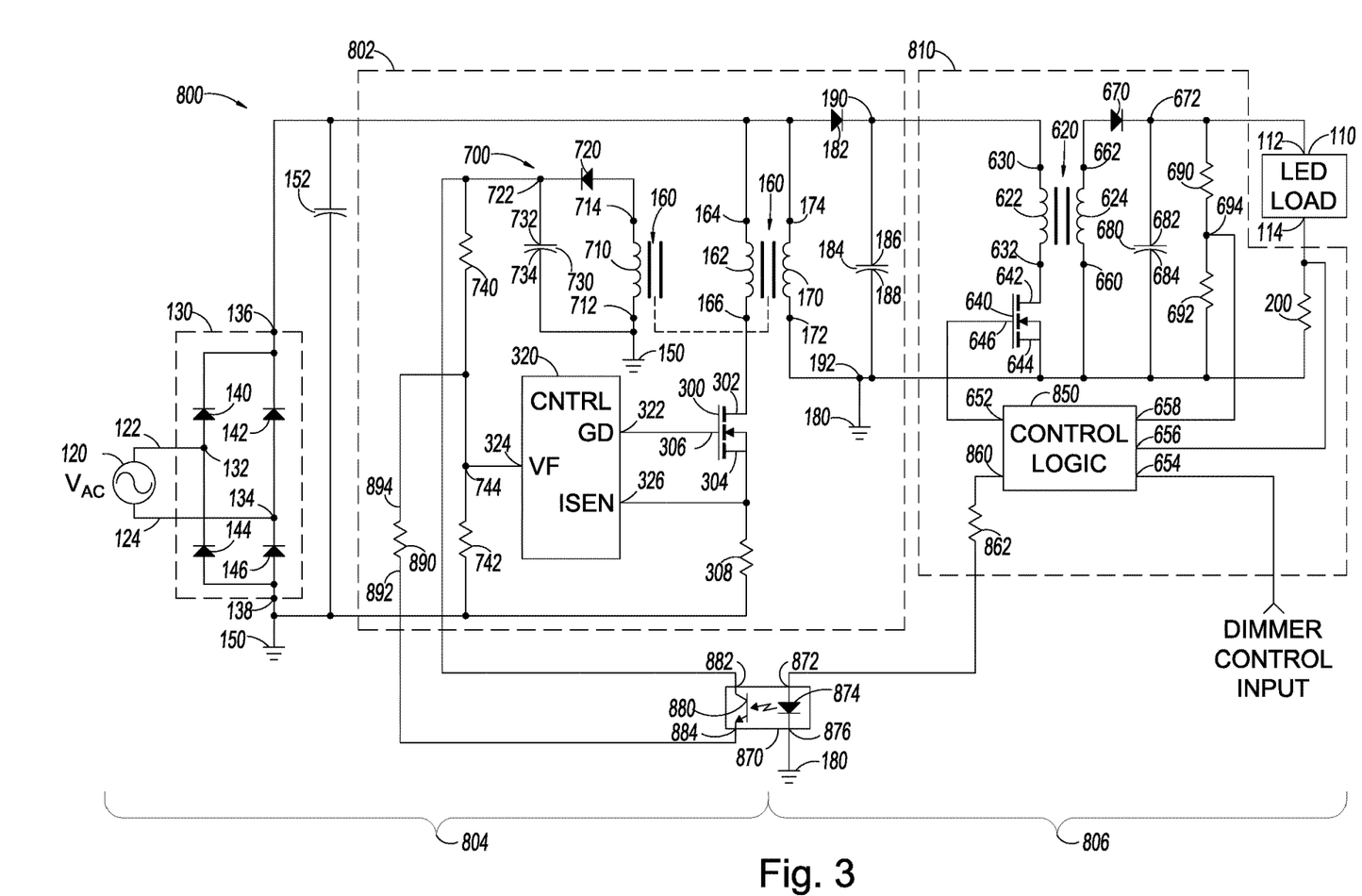
FIG. 3 illustrates a circuit diagram of a further improved LED driver corresponding to the improved LED driver of FIG. 2 and further including low standby power control.

FIG. 3 illustrates an LED driver 800, which is a modification of the LED driver 600 of FIG. 2. The LED driver of FIG. 3 reduces power consumption when the dimmer control input is reduced to a dim level or to a level where the current through the LED load is turned off. The elements of the LED driver of FIG. 3 are labeled with the same reference numbers as the corresponding elements of the LED driver of FIG. 2 and operate in corresponding manners.

The LED driver 800 of FIG. 3 includes a further modified primary flyback converter 802 in a primary section 804. A secondary section 806 includes a modified secondary flyback converter 810. The modified secondary flyback converter of FIG. 3 includes a modified control logic circuit 850 in place of the control logic circuit 650 of FIG. 2. The modified control logic circuit includes the first input terminal 654, the second input terminal 656 and the third input terminal 658, which are connected as described above. The modified control logic circuit also includes the output terminal 652, which is connected to the gate terminal 646 of the second MOSFET 640 as described above. The output terminal 652 is referred to as the "first" output terminal of the modified control logic circuit.

The modified control logic circuit 850 of FIG. 3 also includes a second output terminal 860. The second output terminal of the modified control logic circuit is connected via a current limiting resistor 862 to a first input terminal 872 of an optical isolator 870 and is thus connected to the anode of a light emitting diode (LED) 874 within the optical isolate. The cathode of the LED is connected to the secondary ground reference 180 via a second input terminal 876 of the optical isolator. A phototransistor 880 within the optical isolator has a collector connected to a first output terminal 882 and has an emitter connected to a second output terminal 884.

The first output terminal 882 of the optical isolator 870 is connected to the voltage output node 722 of the primary voltage control circuit 700. The second output terminal 884 of the optical isolator is connected to a first terminal 892 of a third power supply voltage sensing resistor 890. A second terminal 894 of the third power supply voltage sensing resistor is connected to the power supply sensing node 744. As connected, when the phototransistor 880 within the optical isolator is conducting, the third power supply voltage sensing resistor 890 is electrically connected in parallel with the first power supply voltage sensing resistor 740 between the voltage output node 722 to the power supply sensing node 744. When the phototransistor is not conducting the third power supply voltage sensing resistor is effectively disconnected.

The modified control logic circuit 850 operates as described above to receive the voltage inputs on the first input terminal 654, the second input terminal 656 and the third input terminal 658 and to control the first output terminal 652 in response to the voltage inputs. The modified control logic circuit further monitors the voltage of the dimmer control input on the first input terminal to determine when the voltage corresponds to a low dimming level or an off state. When the modified control logic circuit detects a low dimming level or an off state, the modified control logic circuit generates a high logic level on the second output terminal 860 to provide current through the current limiting resistor 862 to turn on the LED 874 within the optical isolator 870. As described below, this high logic level signal is an active standby mode signal. Light emitted by the LED causes the phototransistor 880 to conduct, which causes the third power supply voltage sensing resistor 890 to be connected electrically in parallel with the first power voltage sensing resistor 740 between the voltage output node 722 to the power supply sensing node 744. The lower parallel resistance of the two resistors cause the voltage across the second power supply voltage sensing resistor to be a greater proportion of the voltage on the voltage output node. The switch controller IC 320 adjusts the gate driver signals applied to the gate terminal 306 of the MOSFET 300 to lower the voltage across the transformer windings such that the voltage applied to the secondary filter capacitor 184 is reduced to a standby voltage $V_{STANDBY}$. The reduced voltage reduces the power consumption of the overall LED driver 800. For example, the standby power can be reduced to less than 500 milliwatts. The foregoing can be understood from the following Equation (2), which corresponds to Equation (1) with a resistance $R_{890}$ of the third power supply voltage sensing resistor incorporated into the equation:

$$V_{STANDBY} = N_{SA} \times V_{REF} \left( \frac{\frac{R_{740} \times R_{890}}{R_{740} + R_{890}} + R_{742}}{R_{742}} \right) \quad (2)$$

As illustrated in Equation (2), the bulk voltage generated by the modified primary flyback converter 602 in the standby mode is a second substantially constant voltage that is not affected by the load current through the LED load 110 or the voltage across the LED load. Thus, the modified flyback converter does not receive any feedback from the modified secondary flyback converter 810. Rather, the signal on the second output terminal 860 is a simple mode control signal. When the signal is high, the modified primary flyback converter is in standby mode and generates the lower bulk voltage. When the signal is low (e.g., the standby mode signal is inactive), the modified flyback converter generates the normal bulk voltage.

FIGS. 2 and 3 illustrate two versions of a double flyback technology for LED drivers. In the LED driver 600 and the LED driver 800, the secondary flyback converter 610 is a non-isolated topology, which allows ground reference sharing between the switch 640 and the LED load 110. This simplifies the control and gate drive designs. The secondary flyback converter electrically positions the LED load outside of the power path of the output of the primary flyback converter 602 as applied to the secondary filter capacitor 184. Thus, the LED load is power isolated with respect to the secondary filter capacitor, which provides immunity from the effects of a short circuit of the of the second MOSFET 640. The topologies of the LED drivers of FIGS. 2 and 3 allow the second flyback transformer 620 to have a higher primary-to-secondary turns ratio, which allows the bulk voltage on the secondary filter capacitor 184 to be higher. The higher voltage allows the secondary filter capacitor to have a lower capacitance, which permits a smaller and less expensive electrolytic capacitor to be used. The higher turns ratio of the second flyback transformer allows the first flyback transformer 160 to have a 1:1 turns ratio, which allows the use of bifilar windings and which helps to reduce the leakage inductance, power loss and voltage ringing on the first MOSFET 300. In the embodiment of FIG. 3, a low standby power consumption is achieved by controlling the bulk voltage to a lower level when the dimming control input is set to an off state.

Figure 4:
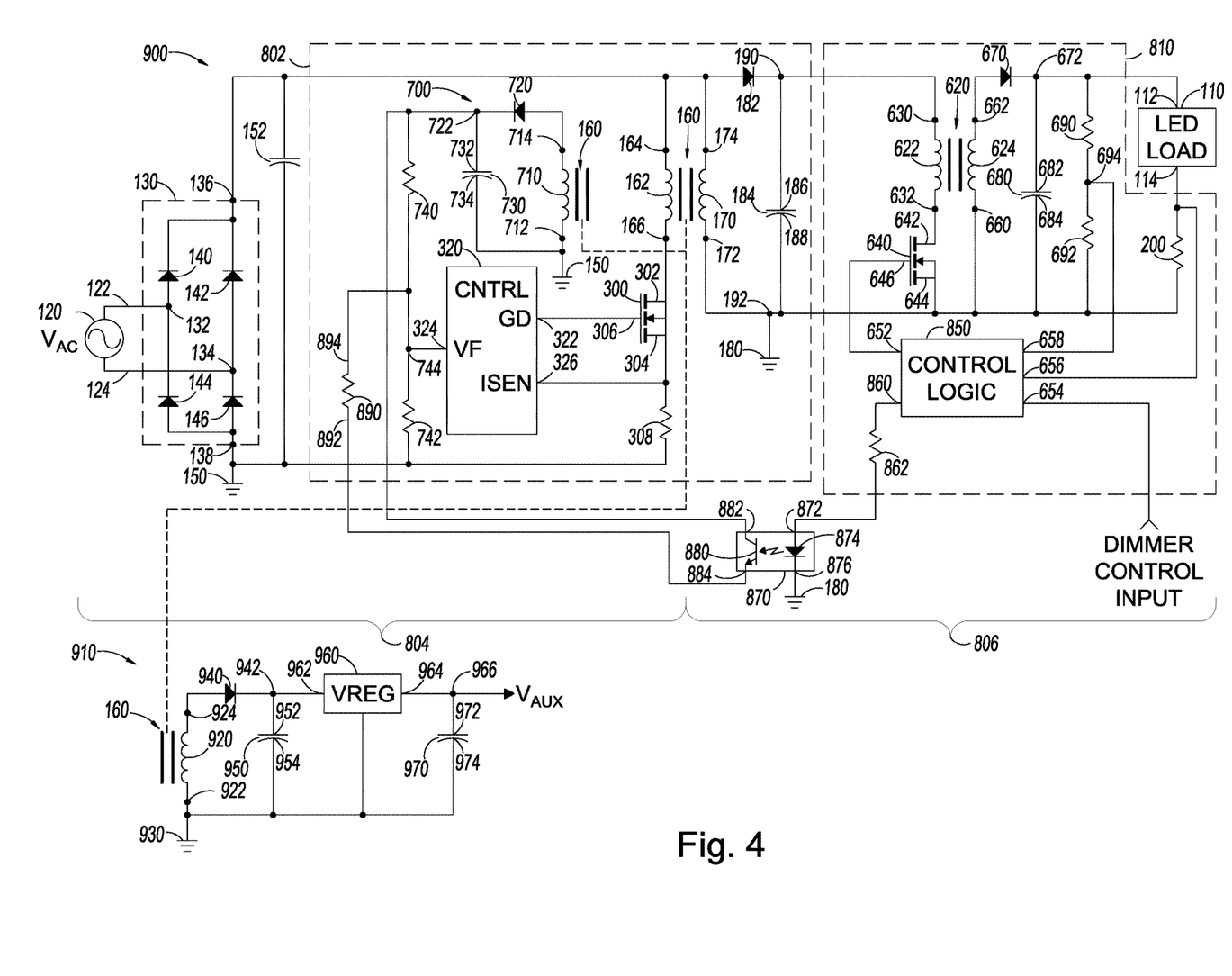
FIG. 4 illustrates a circuit diagram of the LED driver of FIG. 3 with an auxiliary power supply.

An LED driver may need to provide power to other components at a selected voltage. FIG. 4 illustrates an LED driver 900 that provides an auxiliary output voltage. The LED driver 900 of FIG. 4 includes the components of the LED driver 800 of FIG. 3 and the like components are numbered accordingly. The LED driver of FIG. 5 further includes an auxiliary power supply 910 that provides an auxiliary output voltage VAUX. The auxiliary power supply includes a second auxiliary winding 920 on the first flyback transformer 160. The second auxiliary winding has a first terminal 922 and a second terminal 924.

The first terminal 922 of the second auxiliary winding 920 is connected to an auxiliary ground reference 930, which is isolated from the primary ground reference 150 and the secondary ground reference 180. The second terminal 924 of the second auxiliary winding is connected to an anode of an auxiliary power supply diode 940. A cathode of the auxiliary power supply diode is connected to a rectified voltage node 942. The rectified voltage node and the cathode of the auxiliary power supply diode are connected to a first terminal 952 of a first auxiliary power supply filter capacitor 950. A second terminal 954 of the first auxiliary power supply filter capacitor is connected to the auxiliary ground reference.

The rectified voltage node 942 is connected to an input terminal 962 of a voltage regulator 960, which has an output terminal 964. The voltage regulator receives the rectified voltage input and generates the auxiliary voltage VAUX at a selected voltage (e.g., 5 volts, 12 volts or the like). The auxiliary voltage is provided at an auxiliary voltage output node 966 and is applied to a first terminal 972 of a second auxiliary power supply filter capacitor 970. A second terminal 974 of the second auxiliary power supply filter capacitor is connected to the auxiliary ground reference 930.

The auxiliary voltage VAUX on the auxiliary voltage output node 966 is well-regulated and is useable to drive other components (not shown) that require a stable voltage that is referenced to the auxiliary ground reference 930 and that is galvanically isolated from the primary section 804 and the secondary section 806 of the LED driver 900. If the anticipated power requirements of the components supplied with the auxiliary voltage are less than approximately 0.5 watt (500 milliwatts), the voltage regulator 960 can be implemented with a commercially available linear voltage regulator. If the anticipated power requirements of the components are greater than approximately 500 milliwatts, the voltage regulator can be implemented with a conventional buck converter, which may have a lower power loss than a linear regulator at the greater power output requirement.

Because the second auxiliary winding 920 of the transformer 160 is totally electrically isolated from the primary section 804 and from the secondary section 806, the auxiliary power supply 910 meets the requirements of Claim I and Class II wiring. If the rectified voltage at the rectified voltage node 942 is controlled well below 60 volts, the auxiliary voltage VAUX also meets the Class II requirements.

As discussed above, the bulk voltage generated across the secondary filter capacitor 184 is loosely controlled. Thus, the voltage across the first auxiliary power supply filter capacitor 950 is also loosely controlled. To guarantee that the voltage provided to the auxiliary power supply 910 is always sufficient to generate the desired auxiliary voltage VAUX, the bulk voltage across the secondary filter capacitor 180 during the standby mode (e.g., the standby voltage $V_{STANDBY}$) must be greater than the desired auxiliary voltage in accordance with the following Equation (3):

$$\frac{V_{STANDBY}}{N_{SEC/AUX}} > V_{AUX} \quad (3)$$

In Equation (3), $N_{SEC/AUX}$ is the ratio of the number of turns $N_{T\_SEC}$ of the secondary winding 170 of the first switching transformer 160 to the number of turns $N_{T\_AUX}$ of the auxiliary winding 920 of the first switching transformer as represented by the following Equation (4):

$$N_{SEC/AUX} = \frac{N_{T\_SEC}}{N_{T\_AUX}} \quad (4)$$

The sufficiency of the magnitude $V_{STANDBY}$ of the bulk voltage across the secondary filter capacitor 180 during the standby mode is confirmable by controlling the dimmer control input to place the LED driver 900 in the standby mode as described above and measuring the standby voltage.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A two-stage driver for supplying current to a light emitting diode (LED) load, the two-stage driver comprising:
   a first stage having a first flyback converter, the first flyback converter including a first flyback transformer having a primary winding referenced to a primary ground reference, a secondary winding referenced to a secondary ground reference, and at least a first auxiliary winding referenced to an auxiliary ground reference, the first stage configured to receive a non-regulated voltage input and to generate a substantially constant bulk voltage across a first-stage output filter capacitor, the substantially constant bulk voltage referenced to the secondary ground reference;
   an electrically isolated second stage having a second flyback converter, the second stage configured to receive the bulk voltage from the first stage, the second stage further configured to generate a desired current through the LED load; and
   an auxiliary power supply coupled to the first auxiliary winding, the auxiliary power supply generating an auxiliary voltage referenced to the auxiliary ground reference,
   wherein the first flyback converter comprises:
   a second auxiliary winding of the first flyback transformer;
   a first electronic switch that is selectively activated to enable current to flow through the primary winding of the first flyback transformer from the non-regulated voltage input to a primary circuit ground reference, the current flowing through the primary winding of the first flyback transformer inducing a voltage on the secondary winding of the first flyback transformer that is applied to the first-stage output filter capacitor to produce the bulk voltage;
   a first switch controller that controls the first electronic switch to selectively activate the first electronic switch; and
   a primary voltage control circuit coupled to the second auxiliary winding of the first flyback transformer, the primary control circuit generating a first sensed voltage responsive to the bulk voltage across the secondary winding of the first flyback transformer, the first sensed voltage applied to the first switch controller, the first switch controller responsive to the sensed voltage to control the switching of the electronic switch to maintain the bulk voltage at a substantially constant magnitude.

2. The two-stage driver as defined in claim 1, wherein the second flyback converter includes:
- a second flyback transformer having a primary winding and a secondary winding;
- a second electronic switch that is selectively activated to enable current to flow through the primary winding of the second flyback transformer from the first-stage output filter capacitor to a secondary circuit ground reference, the current flowing through the primary winding of the second flyback transformer inducing a voltage on the secondary winding of the second flyback transformer that is rectified and applied to the LED load;
- a current sensor that senses a magnitude of a load current flowing through the LED load and that generates a sensed feedback signal responsive to the sensed magnitude of the load current; and
- a switch controller that applies a switching signal to the second electronic switch to selectively activate the second electronic switch, the switch controller configured to receive the sensed feedback signal as a first input signal and to receive a dimmer control signal representing a desired magnitude of the load current as a second input signal, the switch controller configured to compare the sensed feedback signal to the dimmer control signal and to modify the switching signal to maintain the sensed feedback signal at a magnitude determined by the dimmer control signal.

3. The two-stage driver as defined in claim 2, wherein the second flyback converter further includes a voltage sensing circuit configured to sense the voltage applied to the LED load and to generate a sensed voltage signal, the sensed voltage signal applied as a third input signal to the switch controller, the switch controller further responsive to the sensed voltage signal to further modify the switching signal.

4. The two-stage driver as defined in claim 1, wherein the primary voltage control circuit is configured to receive a standby command signal having an active mode and an inactive mode, the primary voltage control circuit responsive to the standby command signal in the inactive mode to provide the first sensed voltage to the first switch controller at a first sensed voltage level, the first switch controller responsive to the sensed voltage at the first sensed voltage level to control the switching of the electronic switch to maintain the bulk voltage at a first substantially constant magnitude, the primary voltage control circuit responsive to the standby command signal in the active mode to provide the first sensed voltage to the first switch controller at a second sensed voltage level, the first switch controller responsive to the sensed voltage at the second sensed voltage level to control the switching of the electronic switch to maintain the bulk voltage at a second substantially constant magnitude.

5. The two-stage driver as defined in claim 1, wherein the second flyback converter includes:
- a flyback transformer having a primary winding and a secondary winding;
- an electronic switch that is selectively activated to enable current to flow through the primary winding of the flyback transformer from the first-stage output filter capacitor to a secondary circuit ground reference, the current flowing through the primary winding of the flyback transformer inducing a voltage on the secondary winding of the flyback transformer that is rectified and applied to the LED load;
- a current sensor that senses a magnitude of a load current flowing through the LED load and that generates a sensed feedback signal responsive to the sensed magnitude of the load current; and
- a switch controller that applies a switching signal to the electronic switch to selectively activate the electronic switch, the switch controller configured to receive the sensed feedback signal as a first input signal and to receive a dimmer control signal representing a desired magnitude of the load current as a second input signal, the switch controller configured to compare the sensed feedback signal to the dimmer control signal and to modify the switching signal to maintain the sensed feedback signal at a magnitude determined by the dimmer control signal.

6. The two-stage driver as defined in claim 5, wherein the second flyback converter further includes a voltage sensing circuit configured to sense the voltage applied to the LED load and to generate a sensed voltage signal, the sensed voltage signal applied as a third input signal to the switch controller, the switch controller further responsive to the sensed voltage signal to further modify the switching signal.

7. A method of controlling the current through light emitting diodes (LEDs) comprising:
- generating a bulk DC voltage from an input source using a first flyback converter stage having a first flyback transformer, the first flyback transformer having a first primary winding referenced to a primary ground reference, the first flyback transformer having a secondary winding referenced to a secondary ground reference, the secondary ground reference isolated from the primary ground reference, the first flyback transformer having an auxiliary winding referenced to an auxiliary ground reference, the auxiliary ground reference isolated from the primary ground reference and isolated from the secondary ground reference;
- converting the bulk DC voltage to a controlled current through the LEDs using a second flyback converter having a second flyback transformer, the second flyback transformer having a second primary winding referenced to a second ground reference, the second ground reference electrically isolated from the first ground reference;
- rectifying a voltage across the auxiliary winding of the first flyback transformer to produce a rectified voltage and regulating the rectified voltage to generate an auxiliary voltage, the auxiliary voltage referenced to the auxiliary ground reference;
- receiving a standby control signal in an inactive mode and generating the bulk DC voltage at a first magnitude; and
- receiving the standby control signal in an active mode and generating the DC voltage at a second magnitude, the second magnitude lower than the first magnitude.

* * * * *